United States Patent [19]
Klemarczyk et al.

[11] Patent Number: 5,565,499
[45] Date of Patent: Oct. 15, 1996

[54] FILAMENT-WINDING COMPOSITIONS FOR FIBER/RESIN COMPOSITES

[75] Inventors: Philip T. Klemarczyk, Collinsville; Yoshihisa Okamoto, Avon; James P. Moran, Jr., Farmington, all of Conn.

[73] Assignee: Loctite Corporation, Hartford, Conn.

[21] Appl. No.: 468,550

[22] Filed: Jun. 6, 1995

Related U.S. Application Data

[62] Division of Ser. No. 36,325, Mar. 24, 1993, abandoned.

[51] Int. Cl.$^6$ .............. B29C 35/10; C08F 2/50; C08L 63/00
[52] U.S. Cl. .............. 522/013; 522/24; 522/25; 522/104; 522/107; 522/170; 522/182; 522/181; 428/34.5; 428/34.7; 428/36.1; 428/36.3; 428/286; 428/377
[58] Field of Search .............. 522/13, 24, 60, 522/170, 104, 105, 182, 107, 181; 428/34.5, 34.7, 36.1, 36.3, 286, 377

[56] References Cited

U.S. PATENT DOCUMENTS

| | | | |
|---|---|---|---|
| Re. 27,973 | 4/1974 | Pennington et al. | 156/175 |
| 3,224,317 | 12/1965 | Gould | 86/1 |
| 3,226,358 | 12/1965 | Smith et al. | 260/49.95 |
| 3,246,054 | 4/1966 | Guenther et al. | 26/49.95 |
| 3,293,860 | 12/1966 | Stedfeld | 60/263 |
| 3,316,842 | 5/1957 | Schulz | 102/100 |
| 3,353,987 | 11/1967 | Manaka et al. | 117/47 |
| 3,403,199 | 9/1968 | Ramos | 260/830 |
| 3,408,422 | 10/1968 | May | 260/837 |
| 3,441,543 | 4/1969 | Heilman | 260/78.5 |
| 3,450,613 | 6/1969 | Steinberg | 204/159.16 |
| 3,488,404 | 1/1970 | Parker | 260/830 |
| 3,616,070 | 10/1971 | Lemelson | 156/446 |
| 3,660,144 | 5/1972 | Johnson et al. | 117/93.31 |
| 3,660,145 | 5/1972 | Johnson et al. | 117/93.31 |
| 3,660,371 | 5/1972 | Johnson et al. | 117/93.31 |
| 3,678,131 | 7/1972 | Klapprott et al. | 260/837 R |
| 3,772,062 | 11/1973 | Shur et al. | 117/93.31 |
| 3,804,735 | 4/1974 | Radlove et al. | 204/159.23 |
| 3,844,916 | 10/1974 | Gaske | 204/159.16 |
| 3,847,770 | 11/1974 | Radlowe et al. | 204/159.23 |
| 3,878,019 | 4/1975 | Chapman et al. | 156/272 |
| 3,922,426 | 11/1975 | Feltzin | 428/295 |
| 3,925,349 | 12/1975 | Gaske | 204/159.15 |
| 3,929,545 | 12/1975 | Van Dyck et al. | 156/220 |
| 3,935,330 | 1/1976 | Smith et al. | 427/41 |
| 3,937,855 | 2/1976 | Gruenwald | 427/54 |
| 3,982,185 | 9/1976 | Shinn et al. | 339/144 R |
| 3,983,289 | 9/1976 | Nishizaki et al. | 428/268 |
| 3,989,610 | 11/1976 | Tsukada et al. | 204/159.15 |
| 4,012,267 | 3/1977 | Klein | 156/178 |
| 4,012,553 | 3/1977 | Clemens | 428/285 |
| 4,017,453 | 4/1977 | Heilman et al. | 260/42.18 |
| 4,018,333 | 4/1977 | Blackwood | 206/343 |
| 4,025,407 | 5/1977 | Chang et al. | 204/159.14 |
| 4,025,578 | 5/1977 | Siebert | 260/837 R |
| 4,028,204 | 6/1977 | Rosen et al. | 204/159.14 |
| 4,054,029 | 10/1977 | Sayles | 60/253 |
| 4,055,541 | 10/1977 | Riew | 260/47 EN |
| 4,073,835 | 2/1978 | Otsuki et al. | 264/22 |
| 4,088,633 | 5/1978 | Gurney | 260/47 EN |
| 4,092,443 | 5/1978 | Green | 427/53 |
| 4,117,361 | 9/1978 | Smith et al. | 310/208 |
| 4,170,505 | 10/1979 | Zgraggen | 156/162 |
| 4,218,279 | 8/1980 | Green | 156/272 |
| 4,220,513 | 9/1980 | Green et al. | 204/159.23 |
| 4,230,766 | 10/1980 | Gaussens et al. | 428/288 |
| 4,239,077 | 12/1980 | Dixon et al. | 156/272 |
| 4,252,592 | 2/1981 | Green | 156/272 |
| 4,252,593 | 2/1981 | Green | 156/231 |
| 4,276,352 | 6/1981 | Green | 428/473.5 |
| 4,282,353 | 8/1981 | Green | 542/438 |
| 4,308,367 | 12/1981 | Green et al. | 525/529 |
| 4,339,567 | 7/1982 | Green et al. | 528/102 |
| 4,358,477 | 11/1982 | Noomen et al. | 427/54.1 |

(List continued on next page.)

FOREIGN PATENT DOCUMENTS

| | | | |
|---|---|---|---|
| 0403170A3 | 12/1990 | European Pat. Off. | |
| 2421619 | 11/1975 | Germany. | |
| 1508951 | 4/1978 | United Kingdom. | |
| 1522441 | 8/1978 | United Kingdom. | |
| 2003896 | 3/1979 | United Kingdom. | |
| 1570991 | 7/1980 | United Kingdom. | |
| 1570992 | 7/1980 | United Kingdom. | |
| 1575361 | 9/1980 | United Kingdom. | |
| 1591324 | 6/1981 | United Kingdom. | |
| 2089818 | 6/1982 | United Kingdom | 522/13 |

OTHER PUBLICATIONS

Horn, et al., "Ultraviolet Curing Polyester Preimpregnated Materials for Vacuum Bag Laminates and Filament Winding", pp. 1–6.

Rhodes, "Advances in Anhydride Epoxy Systems", Anhydrides & Chemicals, Inc., pp. 2–11 (1991).

Penn, et al., "Epoxy Resins", Ch. 5 in *Handbook of Composites*, G. Lubin, ed., Van Nostrand Reinhold Co., pp. 57–88. 1982.

*Primary Examiner*—Susan W. Berman
*Attorney, Agent, or Firm*—Hoffmann & Baron

[57] ABSTRACT

Resin compositions useful for filament winding applications comprising an epoxy component including at least one polyepoxide resin curable by heat, an olefinicially unsaturated monomer component including at least one polyolefinically unsaturated monomer curable by actinic radiation, at least one photoinitiator, at least one organic peroxide, and a heat activated curing agent for epoxies. The compositions have a viscosity less than about 2000 centipoise (cps) and are capable of retaining this viscosity for at least about 2 hours at a temperature of from about ambient temperature to about 60° C. The resins are capable of being immobilized by actinic radiation exposure and further heat cured without substantial resin drip. One or more organic peroxides are employed, selected from the group of organic peroxides having 10 hour decomposition half lives at temperatures of from about 50° C. to less than about 104° C. Also, fiber resin composites comprising fiber substrates impregnated with the dual-curing resin compositions. Also the process for coating fiber substrates with the dual-curing resin compositions is disclosed.

25 Claims, No Drawings

U.S. PATENT DOCUMENTS

| | | | |
|---|---|---|---|
| 4,368,253 | 1/1983 | Green et al. | 430/326 |
| 4,383,025 | 5/1983 | Green et al. | 430/280 |
| 4,398,014 | 8/1983 | Green et al. | 528/89 |
| 4,412,048 | 10/1983 | Dixon et al. | 525/524 |
| 4,413,052 | 11/1983 | Green et al. | 430/327 |
| 4,416,975 | 11/1983 | Green et al. | 430/327 |
| 4,439,291 | 3/1984 | Irving et al. | 204/159.23 |
| 4,447,586 | 5/1984 | Shimp | 525/504 |
| 4,479,984 | 10/1984 | Levy et al. | 427/54.1 |
| 4,479,990 | 10/1984 | Dixon et al. | 522/170 |
| 4,515,737 | 5/1985 | Karino et al. | 264/22 |
| 4,552,604 | 11/1985 | Green | 156/246 |
| 4,654,097 | 3/1987 | Sauvage | 156/172 |
| 4,666,954 | 5/1987 | Forgo et al. | 522/83 |
| 4,684,567 | 8/1987 | Okamoto et al. | 428/257 |
| 4,775,736 | 10/1988 | Wiggins | 528/91 |
| 4,892,764 | 1/1990 | Drain et al. | 428/34.5 |
| 5,011,721 | 4/1991 | Decker et al. | 428/36.9 |
| 5,137,936 | 8/1992 | Akiguchi et al. | 522/170 |

FILAMENT-WINDING COMPOSITIONS FOR FIBER/RESIN COMPOSITES

This application is a division of Ser. No. 08/036,325 filed Mar. 24, 1993, now abandoned.

BACKGROUND OF THE INVENTION

1. Field of the Invention

The present invention relates generally to fiber/resin composites and to methods of making such composites. In a specific aspect, the present invention relates to resin articles comprising arrays of continuous filaments, such as are formed by filament winding, prepregs and the like.

2. Description of the Related Art

In the field of composite materials, a variety of fabrication methods and techniques have come into usage for producing fiber-reinforced resin matrix materials. Continuous filament processes have evolved which are adapted to automated production of filament-reinforced resin articles. The continuous fiber processes include filament winding, wherein the filament in the form of discrete strands or roving is coated with a resin, then wound on a mandrel at a predetermined angle and winding thickness to yield composite articles having high strength when the resin borne on the filament is cured.

In order to have commercial utility the polymeric resins employed in filament winding operations must exhibit low initial viscosity and long pot-life in the process systems in which they are employed. Low viscosity is required in order that deposition of the resin on the filament be highly uniform in character, as is required to achieve substantially uniform properties in the final product article. If viscosity changes appreciably during the filament winding operation, the applied resin thickness may change significantly, resulting in localized stresses or discontinuities in the final product article, product articles which are not within required dimensional tolerance specifications, and inadequate curing of the resin. In addition, the tensional forces on the resin impregnated filaments being processed will significantly increase as the resin viscosity increases, to such extent that the filament becomes highly susceptible to snapping, i.e., tensionally breaking.

Long pot-life of the resin is particularly necessary in filament winding operations where processing times may be on the order of hours. Since the resin is continuously being applied to the filament in these processes, the resin bath or other source of the resin must be continually replenished with resin coating material, and it is therefore necessary that the resin not "set up" or gel in the source bath or other source container and applicating means.

For example, in the fabrication of rocket motors, a resin-bearing filament is wound onto a solid rocket fuel body. In such applications, since the filament winding operation may take upwards of 6 hours and since viscosity must be substantially stable during this period, a long pot-life resin is essential, and consequently the filament wound body must be rotated until full cure of the resin is achieved, which in the case of conventional epoxy resins can range from hours (for heat cured resins) to days (for resins cured at ambient temperatures). Continuous rotation of the mandrel and filament winding is essential in such cases, since cessation of rotation would result in the viscous resin sagging and dripping under gravitational forces, resulting in a resin-rich lower portion of the product article and a resin-poor upper portion of the product. Accordingly, it is desirable to cure the fiber array quickly once it has been formed.

The difficulties inherent in balancing the properties of long pot-life and a quick and easily controlled cure have resulted in the development of numerous types of resins. And within each class of resin, attempts have been made to vary the conditions under which the resins will cure effectively. The standard resins which have been employed in continuous filament processes, as well as in other systems of fiber/resin composite manufacture, generally have deficiencies which have specifically limited their utility in these processes.

The epoxy resins form an extremely important and versatile class of resins. These resins exhibit excellent resistance to chemicals, will adhere to glass and a variety of other materials, show electrical insulation properties, and are relatively easy to use. Among the epoxy resins, systems employing epoxy compounds in conjunction with olefinically unsaturated compounds have found wide acceptance in the art. In particular, resins comprising epoxies and acrylates have been found to be especially useful. This class of resins includes blends of epoxies and acrylates ("epoxy/acrylate" resins) as well as compositions wherein the principal resin component is an acrylic acid-modified epoxy wherein some or all of the epoxy groups have been consumed to produce unsaturated resins. Partially acrylated epoxies are occasionally identified as "dual-functional" compounds since they are designed to exhibit both epoxy and acrylate functional groups on the same molecule.

Within the aforementioned class of epoxy/acrylate systems, compositions have been generated which are adapted to various cure conditions. Such compositions have employed heat curing mechanisms, actinic radiation curing mechanisms, or a combination of both.

Heat curing alone has several disadvantages including reducing the viscosity of the resin, causing it to become more fluid and thereby making it more difficult to handle the article, as well as more difficult to achieve a product of isotropic character. In applications such as filament winding, this drop in viscosity results in resin drip, as previously mentioned. Yet heat curing of epoxy/acrylate systems is an effective and practical means of curing the resins to the fully hardened state that is the source of the resins' great utility.

Heat cured epoxy resin systems are disclosed by U.S. Pat. Nos. 3,408,422 to May et al., 3,441,543 to Heilman, RE 27,973 (3,594,247) to Pennington et al., 3,678,131 to Klapprott et al., 4,017,453 to Heilman et al., 4,025,578 to Siebert, 4,447,586 to Shimp, 4,515,737 to Karino et al., and 5,011,721 to Decker et al.

Exemplary of heat cured compositions are the compositions of U.S. Pat. No. 3,408,422 to May et al. May et al. discloses compositions of an acrylated epoxy polymer and a hydroxylamine (as a stabilizer), as well as unsaturated monomers and peroxides having decomposition temperatures below 150° C. The compositions described by May et al. are heat cured, and include curing agents such as "onium" salts.

The use of actinic radiation to cure or partially cure, i.e., gel the resin, can substantially increase the viscosity of the resin on the formed article. Actinic radiation generally cannot induce complete hardening of the resin and such systems usually employ a catalyst and/or a heat cure step to fully cure the resins. An example of such a process is U.S. Pat. No. 4,892,764 to Drain et al. which employs ultraviolet (UV) light induced polymerization, and requires additional curing at ambient temperatures for extended periods. The Drain et al. patent also employs an aliphatic diamine catalyst which significantly reduces the pot-life of the uncured resin. While the compositions of the Drain et al. patent exhibit some of the desirable resistance to the drip and sag of resin under the forces of gravity, this is due to the fact that they are designed to be cured at room temperature. The Drain compositions are not intended to be heat-cured and as a result exhibit low glass transition temperatures ($T_g$), thereby having limited utility in applications where the temperature resistance of the cured resins is critical.

Other UV curing systems are found in U.S. Pat. No. 3,922,426 to Feltzin describing filament wound articles impregnated with an ultraviolet light curable resin comprising an unsaturated polyester, an unsaturated monomer, an organic peroxide, and a photosensitizer. More specifically, Feltzin discloses organic peroxides with half-lives at temperatures between 26° C. and 172° C. Other filament winding systems using UV or other actinic radiation to cure resins include U.S. Pat. Nos. 3,660,144, 3,660,145 and 3,660,371 to Johnson et al., 3,772,062 to Shur et al., and 4,479,984 to Levy et al.

Traditionally, dual-curing epoxy/acrylate systems, i.e., systems which employ both an initial actinic radiation exposure and a subsequent thermal polymerization step, have been used for numerous purposes including adhesives, coatings, and prepregs such as those involving filament winding. Such dual-curing prepreg compositions have employed blends of epoxies and acrylates, epoxy curing agents and photoinitiators.

Dual-curing compositions of this kind are described in U.S. Pat. No. 4,092,443 to Green. Green discloses dual-cured filament impregnating resin compositions including a heat curable epoxide or epoxide-containing compound, a photopolymerizable component, such as acrylates, methacrylates and other polyolefinically unsaturated compounds. Heat activated curing agents such as amines, boron trihalides, imidazoles, and anhydrides, as well as optional use of photocatalysts, such as phenones and photo-activated organic peroxides, are also disclosed. The Green compositions, however suffer from a number of the disadvantages associated with dual-cured systems. Principally, these compositions provide little or no resistance to resin drip during the heating step. Articles formed from the Green compositions and process therefore require rotation during heating in order to retain uniformity of resin distribution and the isotropic characteristics and properties dependent thereon.

U.S. Pat. No. 3,937,855 to Gruenwald describes the impregnation of insulated electromagnetic coils with dual-curing resin compositions. The preferred compositions are polyesters solubilized in unsaturated monomers and mixed with peroxides activated by high temperatures along with accelerators such as a tertiary amine or an organo-cobalt compound. The resins described by the Gruenwald patent are quickly gelled by exposing the surface of the applied resin to a highly reactive chemical cross-linking agent, i.e., organic peroxides such as methyl ethyl ketone peroxide, cyclohexanone peroxide, diacetyl peroxide, dilauryl peroxide, cumyl hydroperoxide and benzoyl peroxide. Alternatively, the quick gelation of the resin at the periphery at ambient temperature can be accomplished by incorporation of a photo activator such as a benzoin ether and exposure of the resin to UV light.

U.S. Pat. No. 4,230,766 to Gaussens et al. discloses dual-curing compositions of (meth)acrylated epoxy resins, polyunsaturated monomers, photoinitiators, and organic peroxides. The resins of the Gaussens et al. patent are cured first by ultraviolet light exposure and heat exposure as a second cure step. The peroxides disclosed by Gaussens et al. include lauroyl peroxide and benzoyl peroxide.

U.S. Pat. No. 3,935,330 to Smith et al. describes dual-curing resins including polyepoxide monomers or polymers, urea/formaldehyde resins, or a melamine/formaldehyde resin, and a thermally curable cross-linker. The compositions described by Smith et al. may also include a dual-functional (meth)acrylamide having at least one double bond and at least one oxirane group. Another component of the compositions includes an ultraviolet light sensitive acrylate. Free radical initiators are included such as organic peroxides including di-t-butyl peroxide, benzoyl peroxide, t-butyl hydroperoxide, perbenzoic acid, and t-butyl peracetic acid. Smith et al. also disclose photosensitizers including phenones. The compositions disclosed by Smith et al. are described as being cured by an ultraviolet light exposure and are subsequently exposed to heat.

None of the aforementioned patents disclose dual-curing filament winding or prepreg resin compositions resistant to the resin sag and drip caused by heat curing. Other measures have generally been needed including spraying a curing agent onto an uncured wound article, e.g., U.S. Pat. No. 3,937,855 to Gruenwald or, more commonly, requiring that the wound article be rotated during the heat cure.

Therefore, it would be a significant advance in the art to overcome the above-described difficulties associated with filament winding processes, in a manner which would obviate the use of additional curing steps and long rotation periods heretofore necessary to obtain quality composites having uniform characteristics.

The present invention solves the disadvantages inherent in the prior art by providing compositions that maintain stable low pot-life viscosities for a significant period of time such that commercial filament winding processes are practicable. The compositions of the present invention also exhibit relatively high glass transition temperatures and are intended to be useful in high temperature applications. Unexpectedly, the resin compositions of the present invention allow uniform properties of the cured product to be obtained without drip or excessive flow of the resin during the heat-cure stage.

Accordingly, it is an object of the present invention to provide an improved process for forming fiber/resin composites.

It is a further object of the invention to provide an improved process for filament winding which overcomes the above-described deficiencies of the prior art practice of these processes.

It is another object of the invention to provide filament wound articles which are readily and economically formed, and which are rapidly processed for subsequent handling, packaging, or other processing operations.

Other objects and advantages of the present invention will be more fully apparent from the ensuing disclosure and appended claims.

SUMMARY OF THE INVENTION

In one aspect, the present invention relates to resin compositions useful for filament winding applications. The compositions include an epoxy component including at least one polyepoxide resin curable by heat, an olefinically unsaturated monomer component including at least one polyolefinically unsaturated monomer curable by actinic radiation, at least one photoinitiator, at least one organic peroxide, and a heat activated curing agent for epoxides. The compositions of the present invention have an initial viscosity less than about 2000 centipoise (cps), and are capable of retaining substantially the same viscosity for at least about 2 hours, and preferably about 4 to 8 hours, at temperatures ranging from about ambient temperature up to about 60° C. On being exposed to actinic radiation the compositions are capable of being immobilized to a gelled state which will resist substantial resin drip during the heat cure process.

The resin compositions include an organic peroxide selected from the group of organic peroxides having 10 hour decomposition half lives at temperatures of from about 50° C. to less than about 104° C. Peroxides outside of the upper range have generally not been found to be effective at preventing resin drip. In general, useful peroxides include diacyl peroxides, peroxydicarbonates, peroxyesters, and peroxyketals. Mixtures of peroxides are also contemplated.

Polyepoxide resins useful in the resins of the present invention may be selected from the classes consisting of polyglycidyl and poly($\beta$-methylglycidyl)ethers of dihydric and polyhydric alcohols and phenols, novolaks, alkyl-substituted phenols and halogen-substituted phenols; poly(N-glycidyl) compounds obtained from amines containing at least 2 amino-hydrogen atoms; triglycidylisocyanurate; N,N'-diglycidyl derivatives of cyclic alkaline ureas and hydantoins; and poly(S-glycidyl) derivatives of dithiols. Mixtures of these resins are also useful.

The compositions of the present invention contain at least one polyolefinically unsaturated monomer selected from the group consisting of acrylic and methacrylic resins, vinyl monomers, and unsaturated polyesters solubilized in vinyl monomers. The compositions may also include one or more mono-olefinically unsaturated monomers useful as diluents.

Useful photoinitiators include benzophenone and substituted benzophenones, acetophenone and substituted acetophenones, benzoin and its alkyl ethers, xanthone and substituted xanthones, camphoroquinone peroxyesters, and 9-fluorene carboxylic acid peroxyesters. Mixtures of these compounds may be employed.

The resins contain at least one heat activated curing agent. The curing agent may be an amine-containing compound or an anhydride. When amine-containing curing agents are employed they may be selected from the group consisting of dicyandiamides, boron trifluoride:amine complexes, boron trichloride:amine complexes, latent amine curatives, tertiary amines, aromatic polyamines, and imidazoles. Mixtures of curing agents are also contemplated. Alternatively, the resins may contain a polycarboxylic acid anhydride heat activated curing agent. The anhydride curing agents are generally employed in combination with a minor amount of an amine-containing accelerator for increased cure speed. When the anhydride curing agent is used, the accelerator may also be selected from the group consisting of dicyandiamides, boron trifluoride:amine complexes, boron trichloride:amine complexes, latent amine curatives, tertiary amines, aromatic polyamines, and imidazoles.

In another embodiment, the present invention includes a process for producing fiber/resin composites comprising a fiber substrate and a dual-cured resin composition. The resin composition will comprise at least one polyepoxide resin curable by heat, at least one polyolefinically unsaturated monomer which when subjected to sufficient actinic radiation immobilizes the polyepoxide resin, a photoinitiator, an organic peroxide having a 10 hour decomposition half life at a temperature of from about 50° C. to less than about 104° C., and at least one heat activated curing agent for epoxides.

In this process the fiber resin composite is initially cured by exposure to actinic radiation sufficient to immobilize the polyepoxide resin so that the resin exhibits no resin drip when subjected to a further heat cure step.

In another aspect, the present invention includes fiber/resin composites formed by the process of applying a liquid resin, having a viscosity of about 2000 centipoise (cps) or less and a pot-life of at least 2 hours, and preferably 4 to 8 hours, at temperatures ranging from about ambient temperature to about 60° C., to a fiber, subjecting the fiber/resin composite to actinic radiation sufficient to permanently immobilize the resin, and then subjecting the fiber resin composite to heat sufficient to cure the resin. The resin composition comprises a heat curable polyepoxide resin, an actinic radiation curable polyolefinically unsaturated monomer, a photoinitiator, an organic peroxide having a 10 hour decomposition half life at a temperature of from about 50° C. to less than about 104° C. and a heat activated curing agent for epoxides.

DETAILED DESCRIPTION

Product articles according to the present invention may be made by any of a wide variety of fiber/resin composite forming methods, including those utilized in forming fiber/resin matrices comprising discontinuous fibers. For example, lay-up techniques, sheet molding, resin transfer moldings, etc., as well as methods applicable to the use of continuous filament, such as filament winding, braiding, and pultrusion may be used. Further, fiber/resin composite articles may be formed by a combination of these methods, such as where a solid rod is formed by pultrusion and subsequently used as the core body for filament winding.

In one preferred embodiment, the articles produced according to the invention may comprise a filament array of substantially parallelly aligned, laterally continuous filaments which have been impregnated with the resin compositions of the invention and subjected to actinic radiation curingly effective for the actinic radiation curable resin component of the composition.

As used herein, the term "laterally continuous", when used to describe filament arrays of parallelly aligned filaments, means that the adjacent filaments in the parallelly aligned array have the resin composition between their facing surfaces, without gross voids, spaces, or discontinuities therebetween. The resin composition possesses sufficient flow characteristics, as distinct from drip or sag, to uniformly bind adjacent filaments together.

In producing filament wound articles according to the present invention, wherein the filaments are treated, i.e., coated or impregnated, with the resin composition, the actinic radiation may be applied to the filament prior to, simultaneously with, or subsequent to winding of the treated filament onto the substrate mandrel. Such concurrent actinic irradiation of the resin borne on the filament facilitates a high degree of processing flexibility in the fabrication of such filament wound articles. In this manner, winding of articles of substantially irregular shape is facilitated because irradiating impregnated fibers prior to substrate contact can impart sufficient adhesive and tack qualities to cause the fiber to adhere to the substrate and/or each other while passing over areas where slippage would normally occur. Thus, in some instances, it may be advantageous to irradiate the impregnated filament prior to its application by winding onto the substrate. Alternatively it may be desirable to filament wind the mandrel, and subsequently to irradiate the wound article.

Similarly, in the pultrusion formation of filament articles according to the present invention, an array of parallelly aligned filaments is pultruded through a die imparting a selected cross-sectional shape thereto, the filament having been impregnated with the resin composition of the invention. The resulting shaped filament array is subjected to curingly effective actinic radiation concurrently with its passage through the die. Such concurrent irradiation may be effected either prior to or subsequent to passage of the filament array through the die, insofar as the ultimate shape is imparted somewhat upstream of the die in proximity to the forming die openings. In a specific application, the particular placement and operation of the actinic radiation source for effectuating curing will be readily determinable by those skilled in the art without undue experimentation.

The use of UV light provides significant processing and handling advantages during manufacture by instantly immobilizing the resin. Immobilization of the resin is controlled to provide sufficient gelation to prevent flow out of the part but allow good wetting between layers, thus assuring even resin distribution, reduced void formation and ease of handling of the finished part without resin migration, sagging or dripping. The rapid gelation stage, in most cases, also eases handling during the heat-cure.

Advantages of the present invention include elimination of runs, drips, migration, and resin-rich/resin-poor areas; curing of the resin while parts are stationary, i.e., no requirement for rotation; a process which yields even resin distribution, reduced voids, lessens clean up and reduces resin usage and waste; and the low initial viscosity promotes exceptionally fast filling of parts and composite structures which can be rapidly controlled by UV radiation.

The filament winding processes used with the present compositions are for the most part continuous processes. Typically, the resin composition is housed in an open vessel beneath a rotating roller. The rotating roller is partially submerged in the resin so as to coat the roller as it rotates. Fiber is drawn from a spool and directed through the resin and into contact with the roller surface, whereby the fiber is coated with resin as it passes. Actinic radiation is directed at the coated fiber as it leaves the roller, thereby gelling and immobilizing the resin. The gelled resin is wound on a mandrel, as previously described, and may be further cured, if desired or necessary, by actinic radiation prior to heat cure.

Subsequent to winding, the formed article is placed in an oven at an appropriate cure temperature. In general, the compositions or the present invention can substantially reach a fully cured state by heat curing at about 150° C. to about 200° C. for about two to four hours. It will be appreciated by those skilled in the art that the time and temperature of the heat cure may be varied to reach particular desired results.

The dual curing filament winding resins of the present invention are formulated with the aforementioned polyolefinically unsaturated monomers, and preferably polyacrylate monomers, that form a cross-linked gel upon exposure to actinic radiation, and preferably UV light. This cross-linking prevents resin dripping from the part during the winding and during the heat cure. However, when certain fibers are employed that screen UV light, such as graphite or Kevlar, or when using high winding speeds with most fibers, a portion of the acrylate can remain uncured after exposure to UV light. Thus, although the resin does not drip off the part during filament winding, it may tend to drip during the heat-cure cycle unless appropriate measures are taken to reduce the flowability of the resin.

The degree of gelation of a given resin composition will largely depend on the amount and type of actinic radiation to which it is exposed. Exposure time is easily controllable, as is the intensity and type of radiation. These parameters are easily determinable by one reasonably skilled in the art, and may vary in accordance with the choice of resin composition, fiber substrate and type of product desired. A single actinic source, for example UV light, or alternatively multiple sources of light, may be focused on the resin coated fiber to effectuate gelation. The winding speed can also be closely controlled, thereby controlling the duration of exposure of the resin coated fiber to the beam of radiation. In certain commercial applications, winding speeds of about 12 inches/second to about 20 inches/second are useful. Radiation intensities of, for example UV light, may be from about 120 milliwatts/cm$^2$ to about 180 milliwatts/cm$^2$. These ranges are not in any way intended to be limiting of the present invention, but are merely illustrative of certain useful ranges. Other winding speeds and intensities of light may easily be chosen by those skilled in the art.

In addition, the dilution of the polyolefinically unsaturated portion of the composition by the unreacted epoxy system, and the increased viscosity that occurs upon gelation, together can reduce the degree of vinyl reaction relative to a 100 wt. % vinyl composition, further impeding the thoroughness of the cross-linking and reducing the resin's capacity to resist dripping when heated.

The inclusion of a thermally activated radical source, i.e., a peroxide, will tend to increase the extent of the vinyl reaction as the composition is heated. One effect of a more complete vinyl reaction is to compensate for the decreased viscosity that occurs as the composition heats up to the heat cure onset temperature of the major components (usually a heat-curing epoxy system). Another effect is to compensate for possible inadequacies in the geometry of the actinic cure step where exposure of the resin is not optimal. The peroxide enables the further extension of the gelation of the resin to any portions of the resin which are less fully exposed to the actinic source. The intent is to retain a tacky, relatively soft gel during the application stage, so as to improve adhesion and facilitate handling during fabrication, while at the same time producing a composition which will not drip during the curing heat-up stage.

While not wishing to be bound by any one theory, applicants believe that the peroxide plays a role in the reaction of unreacted vinyl groups trapped in the epoxy resin diluted gel formed during the irradiation stage. Normally, it would be expected that these groups might thermally polymerize during the final high temperature epoxy cure. It is possible, however, that the more extensive vinyl polymerization at a lower temperature, produced by initiation using a suitable peroxide, leads to a stronger structure when the anhydride-hydroxyl reaction takes over in the case of the anhydride curing compositions. Alternatively, the peroxide may be producing direct vinyl bonding to the cured epoxy by abstraction on epoxy compounds followed by vinyl addition to the new radical sites.

As was discussed above, the resin component of partially cured filament wound articles will tend to drip upon heating, generally requiring the rotation of the articles during heat curing to avoid anisotropies. For example, amine curing resin formulations, in accordance with the present invention but containing no peroxide, were used to form composite articles as described elsewhere herein. Articles were formed by filament winding onto mandrels to which thermocouples had been attached, and the rise in temperature of the article during heat cure was then correlated with the onset of resin drip.

It was observed that the onset of the drip of the amine curing resins of the present invention will occur, in the absence of peroxide, generally in the range of from about 80° C. to about 100° C., depending upon the composition of the resin. The peroxide chosen for use in any particular resin formulation will therefore depend in part on the resin drip onset temperature of the formulation. To be useful for the present invention, the peroxide selected must provide sufficient additional cross-linking of the gel to offset any decrease in resin viscosity that would otherwise occur during the heat-up process. In addition, for the benefit of the peroxide to be obtained, the offsetting cross-linking induced by the thermally activated peroxide must occur at a temperature below or near the temperature at which the drip phenomenon begins. Because the decomposition of each peroxide is expressed as a ten hour half-life function of temperature, a peroxide will begin to decompose at temperatures below its ten hour half-life temperature ($T_{1/2}$). The peroxide can therefore begin to cross-link the gelled resin before the temperature rises sufficiently to otherwise cause the resin to drip. In general, the peroxides useful in the present invention will have a $T_{1/2}$ less than about 104° C. Peroxides having $T_{1/2}$'s of about 104° C. or greater generally have not been found to be useful in the resins of the invention. It is believed that such peroxides do not generate sufficient cross-linking of the gel until after resin drip has begun during the heat-up process.

Thus, a range of dual-curing epoxy/polyolefinically unsaturated formulations has been developed. These compositions are designed to form a soft gel which allows for interlayer wetting when exposed to UV radiation. The compositions are further designed to retain their non-flow properties during the heat-up stage of heat-curing by producing additional immobilizing cross-linking during the heat-up. This is accomplished by means of a thermally activated radical source in the formulation, namely the class of peroxides described herein.

A peroxide, which decomposes on heating to form radicals is added to the formulation to initiate the polymerization of any unreacted polyolefinically unsaturated monomer. The choice of peroxide is critical to prevent dripping during heat-cure. The peroxide must possess a 10 hour half-life decomposition temperature of less than 104° C. A peroxide with a higher value decomposes too slowly and the polyolefin does not polymerize sufficiently to prevent dripping during the heat-cure.

A preferred class of compositions of the present invention are the "amine curing resins". These amine curing resins are created by mixing an epoxy resin component comprising at least one polyepoxide, a polyolefinic component including at least one polyacrylate, a photoinitiator and a peroxide, with a curing component comprising an amine-containing heat activated curing agent. Separately, the two components (epoxy component and curing component) of the amine curing resins have essentially unlimited shelf life. When mixed, the compositions can retain a usable viscosity (pot-life) i.e., less than about 2000 centipoise (cps), for a minimum of about 2 and preferably about 4 to 8 hours at temperatures ranging from about ambient temperature to about 60° C. The amine curing resin compositions have a $T_g$ in the range of about 110° C. to about 160° C. when fully cured.

The amine curing resins of the present invention have an epoxy component present in an amount ranging from about 60 wt. % to about 85 wt. %, and preferably, about 63 wt. % to about 75 wt. %; a polyolefinic component present in an amount ranging from about 5 wt. % to about 30 wt. %, and preferably from about 10 wt. % to about 20 wt. % of the composition. Most preferably the polyolefin component is present at about 15 wt. % of the composition. The amine-containing heat activated curing agent is generally present in an amount ranging from about 2 wt. % to about 10 wt. %, and preferably from about 3 wt. % to about 6 wt. %. Most preferably the heat activated curing agent is present in an amount of about 5.5 wt. %. The photoinitiator is generally present in an amount ranging from about 1 wt. % to about 10 wt. %, and most preferably from about 2 wt. % to about 5 wt. %. The free radical initiator (organic peroxide) is present in an amount ranging from about 0.2 wt. % to about 2 wt. %, preferably from about 0.5 wt. % to about 1.5 wt. %. Miscellaneous additives such as wetting and defoaming agents can be added collectively in amounts of about 0.5 to about 1% by weight of the composition, added as part of the resin component. Optionally, fire retardant materials such as phosphorous-containing compounds may be present in amounts of about 2% to about 10%, and preferably about 3% to about 5% by weight of the composition.

Another preferred class of compositions of the present invention are the "anhydride curing resins". These compositions comprise a mixture of an epoxy resin component including at least one polyepoxide, a polyolefinic component including at least one polyacrylate, a photoinitiator, and a peroxide, with a curing component comprising a carboxylic acid anhydride and an anhydride accelerator. The anhydride curing compositions exhibit a $T_g$ of from about 110° C. to about 160° C. when fully cured. The anhydride curing compositions also generally exhibit lower viscosities than the amine curing resins of the present invention. Because the reaction between the epoxy and the anhydride is inherently slower than with amine curing agent, the anhydride curing resins have a greater pot-life capability, e.g., at least a 24 hour pot-life.

In the anhydride curing compositions of the present invention, the epoxy component may be present in amounts ranging from about 37 wt. % to about 48 wt. % of the composition, most preferably from about 40 wt. % to about 45 wt. % of the composition. The anhydride component may be present in amounts ranging from about 33 wt. % to about 43 wt. %, most preferably from about 36 wt. % to about 41 wt. % of the composition. The anhydride accelerator may be present in an amount of about 0.1 wt. % to about 5.0 wt. %; preferably in an amount of about 1.0 wt. % to about 2.0 wt. %. The polyolefinic component may be present in an amount ranging from about 10 wt. % to about 30 wt. %, preferably from about 10 wt. % to about 20 wt. % and most preferably about 12 wt. % to about 15 wt. %. The photoinitiator is present in an amount ranging from about 1 wt. % to about 10 wt. %, and preferably from about 1.5 wt. % to about 5 wt. %. The free radical initiator (organic peroxide) may be present in amounts ranging from about 0.2 wt. % to about 2 wt. %, and preferably from about 0.3 wt. % to about 1 wt. %. Miscellaneous additives such as wetting and defoaming agents can be added collectively in amounts of about 0.5 to about 1% by weight of the composition, added as part of the resin component. Optionally, fire retardant materials such as phosphorous-containing compounds may be present in amounts of about 2% to about 10%, and preferably about 3% to about 5% by weight of the composition.

Epoxy resins useful in the compositions of the present invention include polyepoxides curable by elevated temperature. Examples of these polyepoxides include polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrabis(4-hydroxyphenyl)ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenols substituted in the ring by chlorine atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxy-propyl)-5,5-dimethylhydantoin, and 2-glycydyloxy-1,3-bis(5,5-dimethyl-1-glycidylhydantoin-3-yl)propane.

Such epoxies are available from a variety of commercial sources, such as the EPON series from Shell Chemical Co., the EPI-REZ series from Rhône-Poulenc, the Araldite series from Ciba-Geigy, the D.E.R. series from Dow Chemical Co., and the EPOTUF series from Reichhold.

Also useful are halogenated epoxy resins such as the brominated epoxides available from the sources shown above. Halogenated epoxy resins in combination with other fire retardant materials may be suitable for use as fire retardant additives in the compositions of the present invention.

Especially preferred epoxy resins useful in the present invention are the diglycidyl ethers of bisphenol A marketed under the tradenames EPON 825 and EPON 828 available from Shell Chemical Co., D.E.R. 331 and 332 available from Dow Chemical Co., and the cycloaliphatic epoxy resin marketed as ERL-4221 by Union Carbide Co.

Various epoxies such as the glycidyl ethers marketed as the EPODIL series by Pacific Anchor Chemical Corporation, a division of Air Products and Chemicals Inc., may be added as epoxy diluents, to reduce the viscosities of the resins of the present invention.

It will be understood that the foregoing list of epoxy compounds is intended only to be illustrative in character, and that other compounds having 1,2 epoxide functionality and curable by heat may potentially be employed. Other optional epoxy compounds may be present which have both epoxy functionality and olefinically unsaturated functionality ("dual-functional" resins).

Suitable polyolefinically unsaturated components of the compositions may include poly(meth)acrylic resins, polyvinyl monomers, and polyunsaturated polyesters solubilized in vinyl monomers. As used herein, the term "(meth)acrylic" is intended to be broadly construed to include acrylic as well as methacrylic compounds, e.g., acrylic esters and methacrylic esters.

It is preferred that the polyolefinically unsaturated monomer have a low viscosity to offset the effect of any higher viscosity component so as to retain the low composition viscosity required for effective filament winding. In addition, the polyolefinically unsaturated monomer component may comprise one or more low viscosity monoolefinically unsaturated monomers as diluents, but in any event, the olefinically unsaturated monomer component must comprise at least one polyolefinically unsaturated monomer. As used herein "polyolefinically unsaturated" means having at least two olefinic double bonds. The polyolefinically unsaturated monomers may be used in amounts of about 5% to about 30% and preferably about 10% to 20% by weight of the composition.

Polyacrylates are generally useful, including 1,3-butylene glycol diacrylate, diethylene glycol diacrylate, 1,6-hexanediol diacrylate, neopentylglycol diacrylate, polyethylene glycol diacrylate, tetraethylene glycol diacrylate, methylene glycol diacrylate, pentaerythritol tetraacrylate, tripropylene glycol diacrylate, ethoxylated bisphenol-A-diacrylate, trimethylolpropane triacrylate, di-trimethylolopropane tetraacrylate, dipenterythritol pentaacrylate, pentaerythritol triacrylate and the corresponding methacrylate compounds. Also useful are reaction products of (meth)acrylic acid and epoxide resins, and urethane resins. Suitable poly(meth)acrylic ester compounds are also described in U.S. Pat. Nos. 4,051,195, 2,895,950, 3,218,305, and 3,425,988.

Useful (meth)acrylic resins include esters and amides of (meth)acrylic acid as well as comonomers thereof with other copolymerizable monomers. Illustrative esters include methyl acrylate, methyl methacrylate, hydroxy ethyl acrylate, butyl methacrylate, octyl acrylate, and 2-epoxy ethyl acrylate. Illustrative amides include bytoxymethyl acrylamide, methoacrylamide, and t-butyl acrylamide. Also suitable are copolymers of such compounds, and copolymers with other monomers containing polymerizable vinyl groups.

Another class of resins which are actinic radiation curable and potentially,suitable for use in the compositions in the invention include vinyl monomers such as styrene, vinyl toluene, vinyl pyrrolidone, vinyl acetate, divinyl benzene, and the like.

A further useful class of actinic radiation curable resin materials comprises unsaturated polyesters, solubilized in vinyl monomers, as ordinarily prepared from alpha-beta ethylenically unsaturated polycarboxylic acids and polyhydric alcohols, as described for example in U.S. Pat. No. 4,025,407.

Particularly preferred polyolefinically unsaturated components include trimethylolopropane trimethacrylate, trimethylolpropane triacrylate, dipentaerythritol pentaacrylate, pentaerythritol triacrylate, ethoxylated trimethylolpropane triacrylate, 1,6 hexanediol diacrylate, neopentyl glycol diacrylate, pentaerythritol tetraacrylate, and 1,3 butylene glycol diacrylate. Preferred monoacrylates include cyclohexylacrylate, 2-ethoxyethyl acrylate, 2-methoxyethyl acrylate, benzoyl acrylate, and isobornylacrylate. Such compounds are available from a variety of sources. For example, a preferred polyacrylate, dipentaerythritol monohydroxypentaacrylate is available as SR 399 from Sartomer Co.

It will be understood by those skilled in the art that the foregoing listing of polyolefinically unsaturated compounds is intended only to be illustrative in character, and that any other resin compounds having such functionality in their molecules and curable under actinic radiation conditions may potentially be employed. In addition to those monomers required to be present, other optional monomers may be present which have both acrylate and epoxy functionality ("dual-functional" monomers).

As used herein, "actinic radiation" means electromagnetic radiation having a wavelength of about 700 nm or less which is capable, directly or indirectly, of curing the specified resin component of the resin composition. By indirect curing in this context is meant curing under such electromagnetic radiation conditions, as initiated, promoted, or otherwise mediated by another compound.

Accordingly, a photoinitiator may be added to the composition in an amount effective to respond to the actinic radiation and to initiate and induce curing of the associated resin, via substantial polymerization thereof.

Suitable photoinitiators useful with ultraviolet (UV) actinic radiation curing mono- and polyolefinic monomers include free radical generating UV initiators such as benzophenone and substituted benzophenones, acetophenone and substituted acetophenones, benzoin and its alkyl esters and xanthone and substituted xanthones. Preferred photoinitiators include diethoxy-acetophenone, benzoin methyl ether, benzoin ethyl ether, benzoin isopropyl ether, diethoxyxanthone, chloro-thio-xanthone, azo-bisisobutyronitrile, N-methyl diethanol-amine-benzophenone and mixtures thereof.

Visible light initiators include camphoroquinone peroxyester initiators and 9-fluorene carboxylic acid peroxyesters.

Particularly preferred photoinitiators include 2-hydroxy-2-methyl-1-phenyl-propan-1-one available as Darocur 1173 from EM Industries, Inc., and 2-benzyl-2-(dimethylamino)-1-[4-(4-morpholinyl)phenyl]-1-butanone available as Irgacure 369 from Ciba-Geigy.

The present invention requires the use of organic peroxides having 10 hour decomposition half-lives (10 hr. $T_{1/2}$) at temperatures of from about 50° C. to less than about 104° C. Peroxides having 10 hour decomposition half-lives at temperatures below this range do not yield compositions which have stable pot-life and shelf-life characteristics. Peroxides having 10 hour decomposition half-lives at temperatures above this range have not been found to be effective in preventing resin drip during the heat cure stage.

These peroxides include various diacylperoxides such as diisononanoyl peroxide, decanoyl peroxide, lauroyl peroxide, succinic acid peroxide and benzoyl peroxide.

Also useful are various peroxydicarbonates such as di(n-propyl) peroxydicarbonate, di(sec-butyl)peroxydicarbonate, and di(2-ethylhexyl)peroxydicarbonate.

Further useful peroxides include various peroxyesters such as α-cumylperoxyneodecanoate, 1,1-dimethyl-3-hydroxy-butylperoxyneoheptanoate, α-cumylperoxyneoheptanoate, t-amyl-peroxyneodecanoate, t-butylperoxyneodecanoate, t-amyl-peroxypivalate, t-butylperoxypivalate, 1-1-dimethyl-3-hydroxy-butylperoxy-2-ethylhexanoate, 2,5-dimethyl-2,5-di(2-ethyl-hexanoylperoxy)hexane, t-amylperoxy-2-ethylhexanoate, t-butylperoxy- 2-ethylhexanoate, t-butylperoxyisobutyrate, t-butylperoxymaleic acid, t-butylperoxyacetate, t-amylperoxyacetate, t-amylperoxybenzoate, OO-t-butyl-O-isopropylmonoperoxycarbonate, 2,5-dimethyl-2,5-di(benzoylperoxy)hexane, OO-t-butyl-O-(2-ethylhexyl)monoperoxycarbonate, OO-t-amyl-O-(2-ethylhexyl)monoperoxycarbonate.

In addition, certain peroxyketals are useful in the present invention including 1,1-di(t-butylperoxy)-3,3,5-trimethyl cyclohexane, 1,1-di(t-butylperoxy)cyclohexane, and 1,1-di(t-amylperoxy)cyclohexane.

Preferred organic peroxides include lauroyl peroxide, having a 10 hr. $T_{1/2}$ of 64° C.; t-amylperoxy-2-ethylhexanoate, having a 10 hr. $T_{1/2}$ of 75° C.; and 1,1-di(t-butylperoxy)-3,3,5-trimethylhexane having a 10 hr. $T_{1/2}$ of 96° C. Lauroyl peroxide is available as Alperox-F; t-amylperoxy-2-ethylhexanoate is available as Lupersol 575; and 1,1-di(t-butylperoxy)-2,2,5-trimethylhexane is available as Lupersol 256; all available from Elf Atochem North America, Inc.

Various conventional heat-activated curing agents for epoxies are useful in the present invention including imidazoles, preferably 2-ethyl-4-methyl imidazole, 1-( 2-cyanomethyl)-2-ethyl-α-4-methylimidazole and 2-phenyl-4,5-dihydroxymethyl imidazole; aliphatic cycloaliphatic amines, preferably 2,2'-dimethyl-4,4'-methylene-bis(cyclohexylamine) (Ancamine 2049); aromatic amines, preferably 4,4'-diaminodiphenyl sulfone (Ancamine S and Ancamine SP); a blend of aromatic and aliphatic amines (Ancamine 2038); Lewis Acid catalysts such as boron trifluoride:amine complexes, preferably $BF_3$: benzyl amine (Anchor 1907), $BF_3$:monoethyl amine (Anchor 1948) and liquid $BF_3$:amine complex (Anchor 1222); Lewis Base catalysts such as t-amines, preferably tris(dimethylaminomethyl)phenol (Ancamine K. 54), dimethylaminomethyl phenol (Ancamine 1110); dicyandiamides, preferably dicyandiamide (Amicure CG). The Ancamine, Anchor, and Amicure series are tradenames for heat activated curing agents marketed by Pacific Anchor Performance Chemicals Division of Air Products and Chemicals, Inc.

Especially pertinent to the anhydride resin compositions of the present invention are the acid anhydride epoxy curing agents. These include, preferably, methyltetrahydrophthalic anhydride, methylhexahydrophthalic anhydride, chlorendic anhydride, and nadic methyl anhydride and mixtures thereof. Nadic methyl anhydride is available as AC-methyl from Anhydrides and Chemicals, Inc.

It will be noted that anhydride based catalysis of epoxy polymerization is an inherently slow process. Accordingly, the resin compositions of the present invention generally employ a minor amount of amine accelerators of the anhydride catalysis, preferably benzyl dimethylamine; 2-ethyl-4-methyl imidazole, available as Imicure EMI-24 from Pacific Anchor; and 2,4-diamino-6[2'-methylimidazolyl-(1)']ethyl-s-triazine isocyanurate adduct.

Other additives conventionally used in the art which do not substantially interfere with the objectives of the present invention may be useful. Fillers, diluents, pigments, dyes, surface active agents, flame retardants and the like may be employed for their intended purposes.

The procedure for making the amine curing resin compositions of the present invention may be generally described as follows: the epoxide, polyolefin, photoinitiator, and miscellaneous additives such as defoaming agents, wetting agents and, optionally, fire retardants are blended together to obtain a homogeneous mixture. Peroxide is added and the mixture is further stirred. The resin component and a heat activated curing agent such as ethylmethyl imidazole are then mixed in a proportion of about 17 parts of resin component to 1 part of the curing agent, stirred and deaerated under vacuum. The mixture is then ready for filament winding or preparation of prepreg.

The procedure for making the anhydride compositions of the present invention may be generally described as follows: the resin component is made by mixing the epoxide, polyolefin, photoinitiator, and additional miscellaneous components, such as defoaming agents, wetting agents and, optionally, fire retardants. This blend is stirred until the solution is homogeneous, e.g., approximately 10 minutes. A peroxide is added and the mixture is further stirred, e.g., for an additional 10 minutes. The anhydride component comprises a mixture of an anhydride, such as nadic methyl anhydride, and an anhydride accelerator, such as benzyldimethylamine. This mixture is stirred until homogeneous, approximately 10 minutes. The resin and anhydride components are then mixed in a proportion of about 1.6 parts of the resin component to 1 part of the anhydride component. The mixture is then further stirred and deaerated under vacuum. The composition is then ready for filament winding or for preparation of prepreg.

Consolidation of the adjacent layers into a unitary structure requires sufficient flow of the gelled resin during the heat-cure stage to meld the adjacent filaments into an integral whole and produce a quality part. In cases where excessive UV exposure has been applied in an attempt to alleviate subsequent dripping, the acrylate matrix is too rigid to allow such flow to occur. On the other hand, if the acrylate is insufficiently exposed to actinic radiation so as to create too soft a gel, dripping during the heat-cure stage is inevitable. The immobilization of the resin by actinic radiation must produce a lattice-like matrix that has sufficient gel structure to prevent dripping, but enough flowable character to allow the merger of the respective layers into a unitary mass, during the heat cure stage.

The following non-limiting examples are intended to further illustrate the present invention. Unless otherwise noted, amounts are given in weight percent of the total composition. Viscosities were determined by measuring 75 gram samples in a Brookfield DV I viscometer, using a 25° C. water bath.

EXAMPLE 1

Amine curing resin compositions (Compositions 1–4 set forth in Table I below) were produced in accordance with the procedures of the present invention.

Filament wound articles were produced from the compositions using the general methods described above. In particular, for Compositions 1–4, articles were produced using varying intensities and locations of actinic light and varying winding speeds. Products were made using glass fiber and using carbon fiber.

Glass fiber articles were produced using two different winding speeds; 12 inches/sec. and 20 inches/sec. At each speed, articles were produced which were exposed to one actinic radiation source, producing 120 mW/cm$^2$, focused on the mandrel onto which the fiber was wound. Articles were also produced, at each winding speed, which were exposed to two radiation sources. The first exposure was to a 180 mW/cm$^2$ source as the fiber emerged from the resin bath. The second source was the 120 mW/cm$^2$ source at the mandrel as the fiber was wound. After winding, these various articles were heat cured in an oven at 150° C. for two hours. Regardless of the winding speed and the number and location of actinic sources, the resins of the present invention exhibited no drip upon heat cure. Drip was assessed by collecting resin falling from the wound article onto a collector positioned beneath the article.

Carbon fiber articles were produced in similar fashion, using one or two actinic sources. However, the intensities of the actinic radiation were greater for the relatively UV-opaque carbon fiber windings than for the relatively UV-transmissive glass fiber windings. Specifically, the source directed to the fiber on emerging from the resin bath was 450 mW/cm$^2$ and the source focused on the mandrel was 250 mW/cm$^2$. Carbon fiber articles were produced at only one winding speed, i.e., 4 inches/sec. Again, the articles were heat cured at 150° C. for two hours. Drip was observed in only one case, i.e., Composition 4.

As is evident from Table I, Compositions 1–4 are substantially identical except for the particular peroxide used. It is apparent from the drip data that the peroxides having a 10 hour $T_{1/2}$ of less than 104° C. enable compositions which do not drip on heat-curing regardless of the fiber being used. Composition 4, employing t-butylperbenzoate with a 10 hour $T_{1/2}$ of 104° C., is useful on glass fiber, but is less desirable when applied to carbon fiber, as evidenced by observable drip.

TABLE I

| AMINE CURING RESINS | | | | |
|---|---|---|---|---|
| | 1 wt. % | 2 wt. % | 3 wt. % | 4 wt. % |
| PART A | | | | |
| DIGLYCIDYL ETHER OF BISPHENOL A* | 75 | 75 | 75 | 74.8 |
| NEOPENTYLGLYCOL DIACRYLATE | 15 | 15 | 15 | 14.7 |
| HYDROXYMETHYLPHENYL PROPANONE | 3 | 3 | 3 | 2.9 |
| LAUROYL PEROXIDE (64° C.) | 0.8 | — | — | — |
| T-AMYLPEROXY-2-ETHYL-HEXANOATE (75° C.) | — | 0.8 | — | — |
| DI(t-BUTYLPEROXY) TRIMETHYL-CYCLOHEXANE (96° C.) | — | — | 0.8 | — |
| T-BUTYL PERBENZOATE (104° C.) | — | — | — | 1.6 |
| DEFOAMING AGENT* | 0.5 | 0.5 | 0.5 | 0.5 |

TABLE I-continued

| | AMINE CURING RESINS | | | |
|---|---|---|---|---|
| | 1 wt. % | 2 wt. % | 3 wt. % | 4 wt. % |
| WETTING AGENT* | 0.1 | 0.1 | 0.1 | 0.1 |
| PART B | | | | |
| ETHYL METHYL IMIDAZOLE | 5.6 | 5.6 | 5.6 | 5.4 |
| VISCOSITY (cps) | | | | |
| 0 HOUR | 730 | 860 | 1100 | 950 |
| 2 HOURS | 1050 | — | — | — |
| 4 HOURS | SOLID | — | — | — |
| 8 HOURS | SOLID | 1690 | 1860 | 2030 |
| DRIP ON HOOP WIND | | | | |
| GLASS FIBER | NO | NO | NO | NO |
| CARBON FIBER | NO | NO | NO | YES |

*The diglycidyl ether of Bisphenol A used in this example was EPON 825, available from Shell Chemical Co. The defoaming agent employed in the various examples throughout this specification is a mixture of foam destroying polymers and polysiloxanes. The wetting agent employed in the examples herein is a fluorinated surfactant.

EXAMPLE 2

Anhydride curing resin compositions (Compositions 5–8 set forth in Table II below) were produced in accordance with the procedures of the present invention. As in Example 1 above, articles were made using glass and carbon fibers coated with the anhydride curing resins. Glass fiber articles were wound at 12 inches/sec. and at 20 inches/sec., and at each winding speed, articles were made using single and double irradiations at the intensities as described in Example 1. Upon heat cure none of the resins were observed to drip.

Carbon fiber articles were also formed at a winding speed of 4 inches/sec. using both single and double exposures to actinic radiation. The intensities of the UV light source were 450 mW/cm$^2$ on the fiber on emerging from the resin bath, and 250 mW/cm$^2$ on the fiber as it was wound on the mandrel. No drip was observed upon heat cure except for carbon fiber articles made using Composition 8, in which the peroxide was t-butyl perbenzoate.

As is evident from Table II, Compositions 5–8 are substantially identical except for the particular peroxide used. As with the amine curing resin compositions described above in Table I, it is apparent from the drip data that peroxides having a 10 hour $T_{1/2}$ of less than 104° C. enable anhydride curing compositions to be formulated which do not drip on heat-curing. As was the case in Example 1 above, Composition 8, a resin containing t-butylperbenzoate, when applied to UV-opaque carbon fiber, dripped during heat cure.

TABLE II

| | ANHYDRIDE CURING RESINS | | | |
|---|---|---|---|---|
| | 5 wt. % | 6 wt. % | 7 wt. % | 8 wt. % |
| PART A | | | | |
| DIGLYCIDYL ETHER OF BISPHENOL A | 42.9 | 42.9 | 42.9 | 42.8 |
| TMPTMA* | 14.5 | 14.5 | 14.5 | 14.4 |
| HYDROXYMETHYLPHENYL PROPANONE | 2.2 | 2.2 | 2.2 | 2.1 |
| LAUROYL PEROXIDE (64° C.)** | 0.4 | — | — | — |
| T-AMYLPEROXY-2-ETHYL-HEXANOATE (75° C.)** | — | 0.4 | — | — |
| DI(t-BUTYLPEROXY) TRIMETHYLCYCLOHEXANE (96° C.)** | — | — | 0.4 | — |
| T-BUTYL PERBENZOATE (104° C.)** | — | — | — | 0.8 |
| DEFOAMING AGENT | 0.6 | 0.6 | 0.6 | 0.6 |
| WETTING AGENT | 0.1 | 0.1 | 0.1 | 0.1 |
| PART B | | | | |
| NADIC METHYL ANHYDRIDE | 38.7 | 38.7 | 38.7 | 38.6 |
| BENZYL DIMETHYL AMINE | 0.6 | 0.6 | 0.6 | 0.6 |
| VISCOSITY (cps) | | | | |
| 0 HOUR | 650 | 1086 | 750 | 800 |
| 24 HOURS | 1700 | 1416 | 1700 | 2100 |
| 48 HOURS | 1700 | 2846 | 2000 | 2300 |

TABLE II-continued

| ANHYDRIDE CURING RESINS | | | | |
|---|---|---|---|---|
| | 5 wt. % | 6 wt. % | 7 wt. % | 8 wt. % |
| DRIP ON HOOP WIND | | | | |
| GLASS FIBER | NO | NO | NO | NO |
| CARBON FIBER | NO | NO | NO | YES |

*TMPTMA is an abbreviation for trimethylolpropane trimethacrylate.
*Indicates 10 hour $T_{1/2}$ temperature.

EXAMPLE 3

Resin compositions formulated in accordance with the procedures set forth herein are described in Table III. Composition 9 is representative of an amine curing resin of the present invention. Composition 10 is representative of Example 2 of U.S. Pat. No. 4,092,443 to Green. Composition 11 is representative of the amine curing resin of the present invention, but without an organic peroxide.

TABLE III

| MATERIALS | 9 wt. % | 10 wt. % | 11 wt. % |
|---|---|---|---|
| 2,2-BIS(GLYCIDYLOXYPHENYL) PROPANE* | — | 47.2 | — |
| DIGLYCIDYLETHER OF BISPHENOL A** | 74.4 | — | 75.5 |
| ETHYL METHYL IMIDAZOLE | 5.6 | — | 5.7 |
| DICYANDIAMIDE | — | 3.7 | — |
| NEOPENTYL GLYCOL DIACRYLATE | 14.9 | 47.2 | 15.1 |

TABLE III-continued

| MATERIALS | 9 wt. % | 10 wt. % | 11 wt. % |
|---|---|---|---|
| T-AMYLPEROXY-2-ETHYLHEXANOATE | 1.5 | — | — |
| HYDROXYMETHYLPHENYL PROPANONE | 3 | — | 3.1 |
| BENZYL DIMETHYL ACETAL | — | 1.9 | — |
| DEFOAMING AGENT | 0.5 | — | 0.5 |
| WETTING AGENT | 0.1 | — | 0.1 |

*EPON 828 from Dow Chemical Co.
**EPON 825 from Dow Chemical Co.

The compositions were then used in a filament winding process in accordance with the procedures described herein. These results are tabulated in Table IV, below. This process was conducted using fibers made from glass and graphite, respectively, with each composition being applied to each kind of fiber in separate preparations. In addition, as for previous Examples, two winding speeds were examined; 12 inches/sec. and 20 inches/sec. The coated fibers were first gelled by exposure to UV light at an intensity of 120 mW/cm$^2$ as they were wound around a mandrel, and then placed in an oven for heat curing for 2 hours at a temperature of 150° C. The resin was then observed for evidence of dripping and for quality of part consolidation (Table IV). Contrary to customary practice for dual-curing filament processes, no rotation of the parts in the oven was performed. Rotation is conventionally required to compensate for excessive resin flow during heating which creates drip and non-uniform distribution of the resin on the fiber substrate.

TABLE IV

| | 9 | | 10 | | 11 | |
|---|---|---|---|---|---|---|
| | GLASS | GRAPHITE | GLASS | GRAPHITE | GLASS | GRAPHITE |
| WINDING SPEED = 12 in./sec. | | | | | | |
| PART CONSOLIDATION | GOOD | GOOD | POOR | GOOD | GOOD | GOOD |
| DRIP DURING HEAT CURE | NO | NO | YES | YES | NO | YES |
| WINDING SPEED = 20 in./sec. | | | | | | |
| PART CONSOLIDATION | GOOD | — | POOR | — | GOOD | — |
| DRIP DURING HEAT CURE | NO | — | YES | — | NO | — |

Composition 9, representing the amine curing resin of the present invention, was found to be free of drip and maintained uniformity of resin distribution throughout the substrate layers.

Composition 10, representative of those exemplified in the above-mentioned patent to Green, was found not to be useful for winding applications in accordance with the present invention. The results of the heat-cure demonstrated observable dripping and loss of uniformity in the resin distribution. The Green composition does not employ peroxides in accordance with the present invention. Instead, Green uses benzyl dimethyl acetal, described as a photopolymerization catalyst.

Composition 11 is representative of a composition similar to the amine curing resin of the present invention, but lacking the peroxide. The resin without peroxide exhibited variable results, as shown in Table IV above. When applied to graphite fiber, Composition 11 showed significant resin drip upon heat cure. However, when applied to glass fiber, at winding speeds of both 12 and 20 in./sec., the resin provided good part consolidation and no significant resin drip upon heat cure. It is believed that the glass fiber transmits sufficient UV light for the resin to gel even in the absence of the peroxide. But the composition without a peroxide is not effective as an amine curing resin for the impregnation of UV-opaque fibers.

Compositions 4 (Example 1) and 8 (Example 2), employing t-butyl perbenzoate with a $T_{1/2}$ of 104° C., demonstrate performance substantially comparable to Composition 11 having no peroxide at all. These compositions are less effective for applications involving UV-opaque fiber, such as carbon fiber, and they are therefore less desirable. It is apparent from these experiments that the presence of peroxides having the requisite 10 hour $T_{1/2}$ of less than 104° C. enable the creation of a filament wound composite which has non-drip capability during the heat-cure stage.

tage of relatively long pot-life. A long resin pot-life is desirable for practical industrial use since it can eliminate the need for two component mixing/metering machines and their associated clean up and maintenance problems.

Table V, below, also provides a comparison of the glass transition temperatures ($T_g$) of the resin compositions of the present invention (Compositions 13 and 14) with that of a resin of the Drain et al. patent (Composition 12). Compositions 13 and 14 have $T_g$ s of 120° C. and 152° C., respectively, while Composition 12 has a $T_g$ of 80° C. The higher glass transition temperatures of the compositions of the present invention provide greater temperature resistance when used in fiber composite articles, and unlike the resins of Drain et al., are useful in higher temperature applications.

TABLE V

|  | 12<br>DRAIN ET AL.<br>RESIN<br>PHR | 13<br>AMINE CURING<br>RESIN<br>PHR | 14<br>ANHYDRIDE CURING<br>RESIN<br>PHR |
| --- | --- | --- | --- |
| EPOXY MATERIALS |  |  |  |
| 2,2-BIS(GLYCIDYLOXYPHENYL) PROPANE* | 100 | 100 | 100 |
| DIGLYCIDYL ETHER OF BISPHENOL A* | — | 100 | — |
| CYCLOALIPHATIC EPOXIDE* | — | — | 18 |
| ACRYLATE MATERIALS |  |  |  |
| DPMP* | 20 | — | 21 |
| HEXANEDIOL DIACRYLATE | — | 20 | 10 |
| HYDROXYPROPYL METHACRYLATE | — | — | 12 |
| T-BUTYL PERBENZOATE | 2 | 2 | 2 |
| HYDROXYMETHYLPHENYL PROPANONE | 1 | 4 | 5 |
| DIAMINO POLYPROPYLENE OXIDE* | 20 | — | — |
| ETHYL METHYL IMIDAZOLE | — | 7.5 | 0.5 |
| NADIC METHYL ANHYDRIDE | — | — | 124 |
| VISCOSITY (cps) |  |  |  |
| 0 HOUR | 960 | 660 | 640 |
| 2 HOURS | 10,000 | — | — |
| 8 HOURS | 260,000 | 1270 | — |
| 24 HOURS | SOLID | 3610 | 1070 |
| Tg (°C.) | 80 | 120 | 152 |

*The 2,2-bis(glycidyloxyphenyl) propane used in for Examples 12–14 was EPON 828 available from Shell Chemical Co. The diglycidyl ether of Bisphenol A was EPON 825 also available from Shell Chemical Co. The cycloaliphatic epoxide used was ERL-4221 available from Union Carbide Co. DPMP is an abbreviation for dipentaerythritol monohydroxy pentaacrylate. The diamino polypropylene oxide used in the examples was Jeffamine D-230 available from Texaco.

EXAMPLE 4

Table V, below, summarizes a comparison of the viscosities of the resins of the present invention (Compositions 13 and 14) against the viscosity of a resin described by the aforementioned Drain et al. patent (Composition 12). The viscosities of Compositions 12–14 were determined by measuring the viscosity of 75 gram samples of each composition on a Brookfield DV I viscometer, using a 25° C. water bath. The two resin examples of the present invention retain commercially useful low viscosities, i.e., <2000 cps, for at least eight hours at ambient light and temperature, while the Drain et al. composition becomes unworkable within two hours. It is apparent therefore that the compositions of the present invention possess the significant advan-

EXAMPLE 5

This example is intended to demonstrate, using thermogravimetric analysis, that the compositions and processes of the present invention allow for non-drip properties during heat cure. Through the use of thermogravimetric analysis, the uniformity of resin distribution can be determined, thereby evidencing the non-drip feature.

The data shown in Table VI are the results of a comparison of two filament windings using an amine curing resin composition of the present invention. The amine curing composition was prepared according to the procedures described herein using 74.4 wt. % diglycidyl ether of Bisphenol A, 5.6 wt. % ethyl methyl imidazole, 14.9 wt. % neopentyl glycol diacrylate, 1.5 wt. % t-amylperoxy- 2-ethyl-hexanoate, 3.0 wt. % 2-benzyl-2-methyl-1-phenyl-propan-1-one, along with 0.5 wt. % defoaming agent and 0.1 wt. % wetting agent. Filament winding was performed in general accordance with the procedures described above. Fiberglass was impregnated at a speed of 12 in./sec. and formed into articles by winding onto two separate mandrels. One winding was exposed to UV light at an intensity of 120 mW/cm$^2$. Another winding was not exposed to UV light. Both articles were heat-cured without rotation for 2 hours at 150° C.

TABLE VI

|  | UV AND HEAT | HEAT ONLY |
|---|---|---|
| RESIN WT. % - TOP | 25.7 | 24.7 |
| RESIN WT. % - BOTTOM | 25.6 | 30.0 |
| DRIP | NO | YES |

The data in Table VI are the results of thermogravimetric analysis (TGA) of the heat-cured articles. TGA was performed in accordance with the principles described in W. W. Wendlandt and P. K. Gallagher, "Instrumentation", Chapter 1 of *Thermal Characterization of Polymeric Materials*, E. A. Turi, ed., Academic Press, 1981.

The resultant articles were then subjected to thermogravimetric analysis for determination of uniformity of resin distribution. Sections of the top and bottom of the wound article were cut off, weighed, and the weighed samples then heated slowly to a temperature of 800° C., a temperature sufficient to burn off the resin coating leaving the heat resistant fiber behind. During the heating process, the samples weights are monitored by the instrument. The final difference in the weights of the sample before and after heating, provides a measure of the quantity of resin present in the sample. Uniformity of resin distribution is indicated if the resin proportion of each sample is substantially identical. If a substantial difference in sample weights is observed, then the resin is deemed to have been distributed non-uniformly on the article due to excessive resin flow and drip during heat cure.

If desired, the uniformity of the coating of the resin onto the fiber may be determined prior to winding of the coated fiber onto a mandrel. However, it will be noted by those having skill in the art that any initial irregularity or non-uniformity of resin coating on the fiber will not affect the uniformity of the wound article because of the ability of the gelled resin to flow and merge with overlapping resin during winding onto the mandrel.

Samples were taken from the top and bottom portions of each article. The TGA results show that the article initially cured by UV exposure retained uniform resin distribution without the necessity for rotating the part during the heat-cure step. Furthermore, no resin drip was observed on the UV cured article. The data also show that in the absence of UV exposure the resin will flow from the top portion of the article to the bottom, and that the resin will also drip during the heat-cure. The article will thereby become substantially anisotropic.

EXAMPLE 6

A further example of the anhydride curing compositions of the present invention is shown below in Table VII. Fiberglass articles made using this composition were UV cured and then heat cured, preferably by heating at 170° C. for 1 hour.

TABLE VII

|  | WT. % |
|---|---|
| RESIN COMPONENT | |
| DIGLYCIDYL ETHER OF BISPHENOL A | 57.47 |
| CYCLOALIPHATIC EPOXIDE* | 11.77 |
| MODIFIED DIGLYCIDYL ETHER OF BISPHENOL A* | 9.98 |
| DPMP* | 10.21 |
| HYDROXYPROPYL METHACRYLATE | 3.31 |
| T-BUTYL PERBENZOATE | 1.19 |
| WETTING AGENT | 0.12 |
| METHYL IMIDAZOLE | 5.85 |
| TOTAL | 100.00 |
| ANHYDRIDE COMPONENT | |
| NADIC METHYL ANYDRIDE | 98.92 |
| PHOTOINITIATOR | 1.08 |
| TOTAL | 100.00 |

*In Table VII, the cycloaliphatic epoxide used was ERL 4221 available from Union Carbide Co. The modified diglycidylether of Bisphenol A was EPI-REZ 5027 available from Rhône Poulenc. DPMP is an abbreviation for dipentaerythritol monohydroxy pentacrylate. The photoinitiator used was 2-benzyl-2-dimethylamino-1-[4-(4-morpholinyl)phenyl]-1-butananone.

While the invention has been described with reference to specific embodiments, it will be apparent that numerous variations, modifications and embodiments are possible, and accordingly all such variations, modifications and embodiments are to be regarded as being within the spirit and scope of the present invention.

What is claimed is:

1. A filament winding composition comprising
   a. an epoxy component including at least one polyepoxide resin curable by heat;
   b. an olefinically unsaturated monomer component including at least one polyolefinically unsaturated monomer curable by actinic radiation;
   c. at least one photoinitiator which is not a peroxide having a ten hour decomposition half-life at temperatures from about 50° to less than about 104° C.
   d. at least one heat activated organic peroxide for said olefinically unsaturated monomer component, said peroxide having a ten hour decomposition half-life at temperatures from about 50° C. to less than about 104° C. and which is substantially unreactive in the presence of actinic radiation and in the absence of a photosensitizer; and
   e. at least one heat activated curing agent for said epoxy component, comprising
      (i) at least one carboxylic acid anhydride; and
      (ii) at least one anhydride accelerator compound,
   wherein said composition when immobilized with actinic radiation and further heat-cured without substantial resin drip yields a $T_g$ of at least about 110° C.

2. The composition of claim 1 wherein the organic peroxide is selected from the group consisting diacylperoxides, peroxydicarbonates, peroxyesters, peroxyketals and mixtures thereof.

3. The composition of claim 1 wherein the organic peroxide is selected from the group consisting of lauroyl peroxide, t-amylperoxy-2-ethylhexonate and 1,1-di(t-butylperoxy)-3,3,5-trimetyhylhexane.

4. The composition of claim 1 wherein the organic peroxide is included in an amount of from about 0.2 wt. % to about 2 wt. %.

5. The composition of claim 4 wherein the organic peroxide is included in an amount of from about 0.3 wt. % to about 1.0 wt. %.

6. The composition of claim 1 wherein the polyepoxide resin is selected from the group consisting of polyglycidyl and poly(β-methylglycidyl)ethers of dihydric and polyhydric alcohols and phenols, novolaks, alkyl-substituted phenols and halogen-substituted phenols, poly(N-glycidyl) compounds obtained from amines obtained from amines containing at least two amino-hydrogen atoms, triglycidylisocyanurate, N,N'-diglycidyl derivatives of cyclic alkaline ureas and hydantoins, poly(S-glycidyl) derivatives of dithiols and mixtures thereof.

7. The composition of claim 6 wherein the polyepoxide resin is selected from the group consisting of diglycidyl ethers of bisphenols.

8. The composition of claim 1 wherein the polyepoxide resin is included in an amount of from about 37 wt. % to about 48 wt. %.

9. The composition of claim 8 wherein the polyepoxide resin is included in an amount of from about 40 wt. % to about 45 wt. %.

10. The composition of claim 1 wherein the polyolefinically unsaturated monomer is selected from the group consisting of acrylic and methacrylic resins, vinyl monomers, unsaturated polyesters solubilized in vinyl monomers and mixtures thereof.

11. The composition of claim 10 wherein the polyolefinically unsaturated monomer is selected from the group consisting of trimethylolopropane trimethacrylate, trimethylolpropane triacrylate, dipentaerythritol monohydroxypentaacrylate, pentaerythritol triacrylate, ethoxylated trimethylolpropane triacrylate, 1,6-hexanediol diacrylate, neopentyl glycol diacrylate, pentaerythritol tetraacrylate, and 1,3-butylene glycol diacrylate.

12. The composition of claim 1 wherein the polyolefinically unsaturated monomer is included in an amount of from about 10 wt. % to about 30 wt. %.

13. The composition of claim 12 wherein the polyolefinically unsaturated monomer is included in an amount of from about 10 wt. % to about 20 wt. %.

14. The composition of claim 1 wherein the photoinitiator is selected from the group consisting of benzophenone and substituted benzophenones, acetophenone and substituted acetophenones, benzoin alkylethers, xanthone and substituted xanthones, camphoroquinone peroxyesters, 9-fluorene carboxylic acid peroxyesters and mixtures thereof.

15. The composition of claim 14 wherein the photoinitiator is selected from the group consisting of benzoin, 2-hydroxy-2-methyl-1-phenyl-propan-1-one and 2-benzyl-2-(dimethylamino)-1-[4-(4-morpholinyl)phenyl]-1-butanone.

16. The composition of claim 1 wherein the photoinitiator is included in an amount of from about 1 wt. % to about 10 wt. %.

17. The composition of claim 16 wherein the photoinitiator is included in an amount of from about 1.5 wt. % to about 5 wt. %.

18. The composition of claim 1 wherein the carboxylic acid anhydride is selected from the group consisting of methyltetrahydrophthalic anhydride, methylhexahydrophthalic anhydride, chlorendic anhydride, nadic methyl anhydride and mixtures thereof.

19. The composition of claim 1 wherein the anhydride is included in an amount of from about 33 wt. % to about 43 wt. %.

20. The composition of claim 19 wherein the anhydride is included in an amount of from about 36 wt. % to about 41 wt. %.

21. The composition of claim 1 wherein the anhydride accelerator is selected from the group consisting of dicyandiamide, boron trifluoride:amine complexes, boron trichloride:amine complexes, latent amine curatives, tertiary amines, aromatic polyamines, imidazoles and mixtures thereof.

22. The composition of claim 21 wherein the anhydride accelerator is selected from the group consisting of benzyl dimethylamine, 1-(2-cyanoethyl)- 2-ethyl-4-methylimidazole, 2-ethyl-4-methyl imidazole, and 2,4-diamino-6 [2'-methylimidazolyl-(1)']ethyl-s-triazine isocyanurate adduct.

23. The composition of claim 1 wherein the anhydride accelerator is included in an amount of from about 0.1 wt. % to about 5.0 wt. %.

24. The composition of claim 1 wherein said composition has an initial viscosity of about 2000 centipose or less and is capable of retaining said viscosity for at least about 2 hours at a temperature of from about ambient temperature to about 60° C.

25. The composition of claim 1 wherein said viscosity remains from about 300 centipoise to about 2,000 centipoise for a minimum of about 6 hours at a temperature of from about ambient temperature to about 60° C.

* * * * *

UNITED STATES PATENT AND TRADEMARK OFFICE
CERTIFICATE OF CORRECTION

PATENT NO. : 5,565,499
DATED : October 15, 1996
INVENTOR(S) : Klemarczyk, et al.

It is certified that error appears in the above-indentified patent and that said Letters Patent is hereby corrected as shown below:

At column 1, lines 46-47, "necessary infilament" should read --necessary in filament--.

At column 12, line 52, "potentially,suitable" should read --potentially suitable--.

At Table II at column 19, approximately line 12, "*Indicates 10 hour $T_{1/2}$ temperature." should read --**Indicates 10 hour $T_{1/2}$ temperature.--.

Signed and Sealed this

Twenty-eighth Day of January, 1997

Attest:

BRUCE LEHMAN

Attesting Officer    Commissioner of Patents and Trademarks